Figures 1, 2:
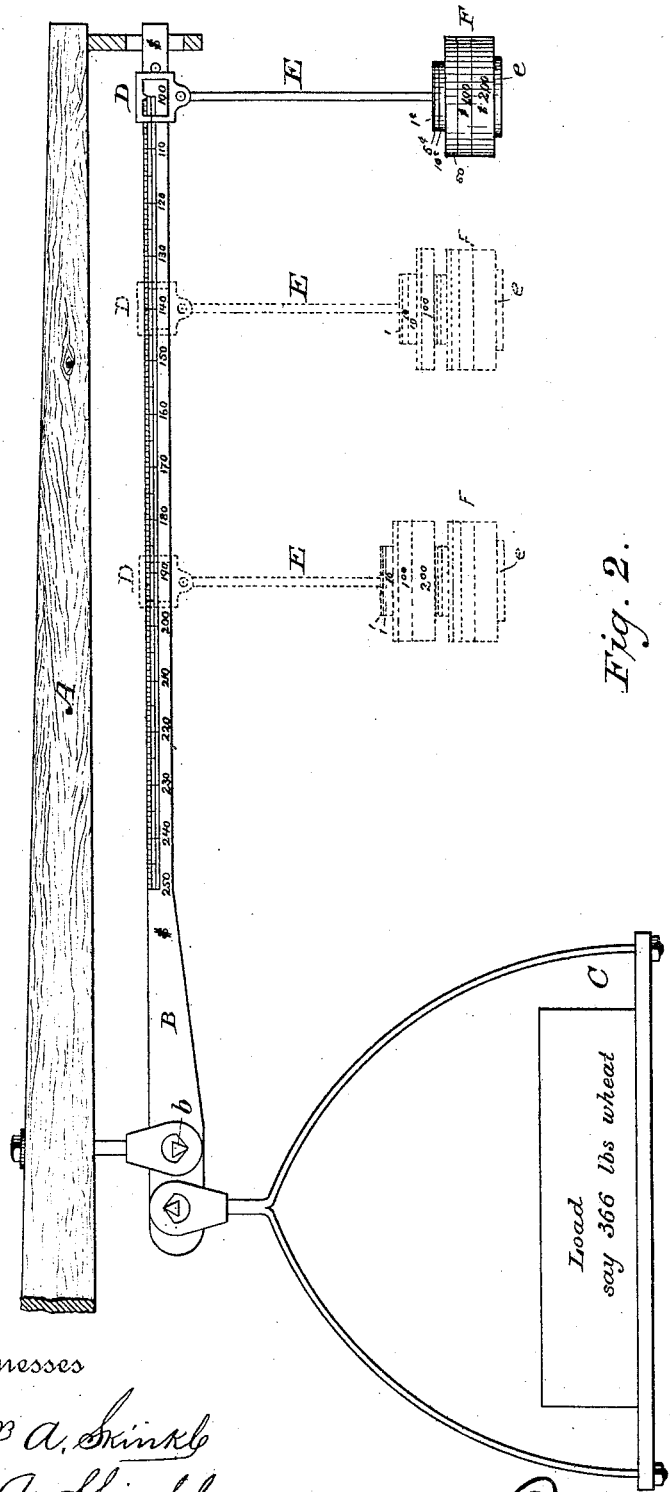

(No Model.) 2 Sheets—Sheet 1.

G. L. PHELPS.
WEIGHING SCALES.

No. 408,319. Patented Aug. 6, 1889.

Load say 366 lbs wheat

Witnesses
Wm A. Skinkle
C. A. Skinkle

Inventor
George L. Phelps
By his Attorneys
Parkinson & Parkinson (No Model.) 2 Sheets—Sheet 2.
G. L. PHELPS.
WEIGHING SCALES.
No. 408,319. Patented Aug. 6, 1889.
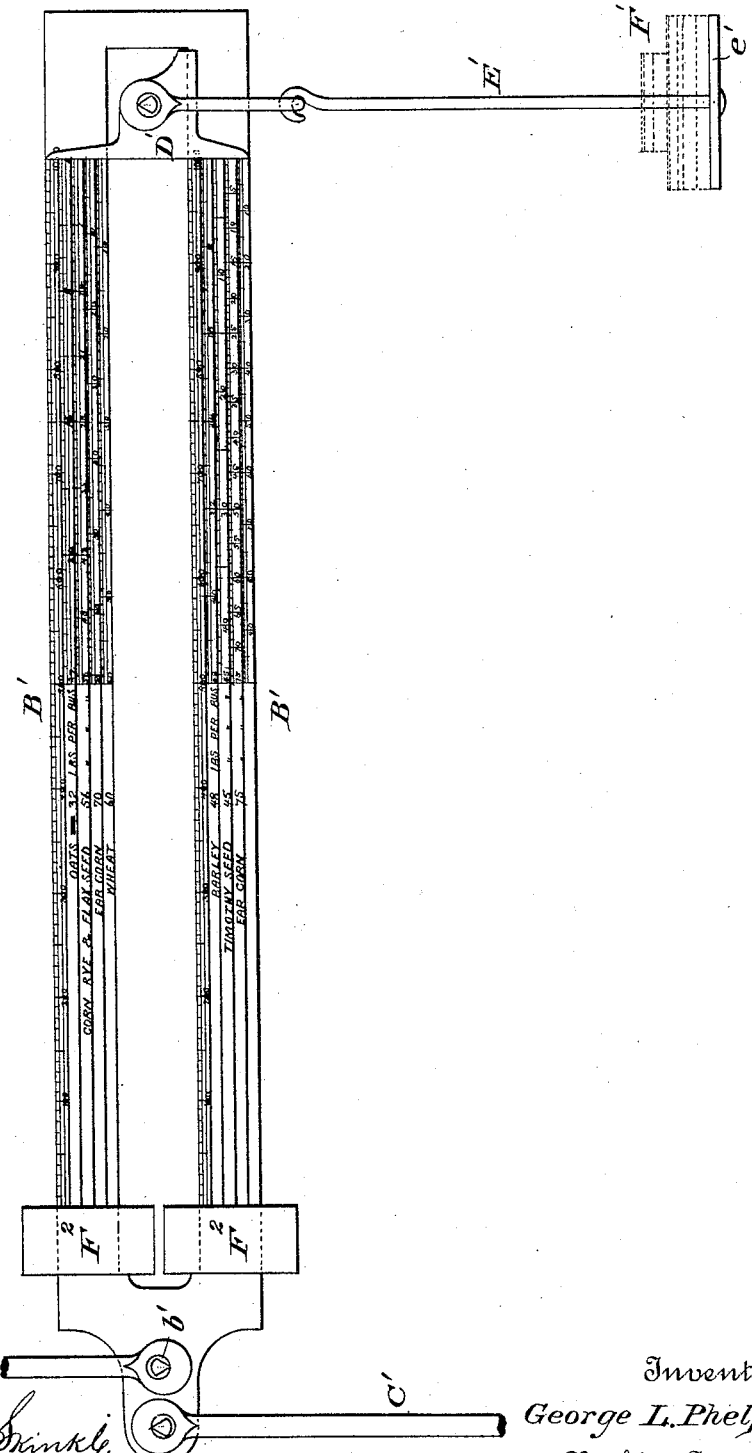
Witnesses
Wm A. Skinkle
C. A. Skinkle
Inventor
George L. Phelps.
By his Attorneys
Parkinson & Parkinson

UNITED STATES PATENT OFFICE.

GEORGE L. PHELPS, OF CHICAGO, ILLINOIS.

WEIGHING-SCALES.

SPECIFICATION forming part of Letters Patent No. 408,319, dated August 6, 1889.

Application filed March 30, 1889. Serial No. 305,480. (No model.)

*To all whom it may concern:*

Be it known that I, GEORGE L. PHELPS, a citizen of the United States, residing at Chicago, in the county of Cook and State of Illinois, have invented certain new and useful Improvements in Scales, of which the following is a specification.

My invention has for its object to enable the person using the scale to ascertain the weight and price of an article or quantity of goods at a single operation; and it consists in arranging and graduating the beam-scale in such corelation with the disks or other scale-weights representing values that one unit of the scale effectually equals one unit of weight or its multiple, and vice versa, all as will appear from the succeeding description and by reference to the accompanying drawings, in which—

Figure 1 is a side elevation of a scale embodying my improvement in a restricted form; Fig. 2, an enlarged view of a portion of the beam of said scale, showing the finer graduations thereon; and Fig. 3, a side elevation of a scale embodying said improvement in a more extended and preferable form.

In the first construction, A represents a suitable frame for the support of the operative parts of the scale; B, the scale-beam, pivoted at *b* and supporting the pan or platform C; and D is the sliding marker, carrying, by means of a pendent link E and a disk *e* at the bottom of said link, the weights or counterpoises F, of which there will be any suitable number. These parts as thus far described are taken as exemplars of corresponding parts in any suitable type of scale.

The scale-beam is graduated up from the unit-point, which in this instance is at the extreme end of the beam, the scale being in exact balance when the weight-pendant E *e* is at this point with no load on the platform. The weights, which are hung upon the pendant, are multiples of a unit, which represent two values—to wit, money value and weight value—a weight which balances one pound representing a money value of one cent, or a weight which would balance one hundred pounds representing a money value of one dollar. The scale-beam is correspondingly or proportionately graduated up from the unit $1.00, or whatever it may be at the end, to any reasonable number to represent either dollars and cents or pounds.

The selling-price of any certain line of goods—say cereals—never varies beyond a certain range—say from one dollar to two dollars and fifty cents per hundred pounds—and the scale-beam and weights will in practice be graduated to adapt them to this class of goods. In the example shown in the drawings the lowest mark on the beam is $1.00 and the highest $2.50, and the scale is provided with an ample number of weights that are units or multiples thereof, of one pound or 1 cent. Now, if the grain is selling at its lowest price of one dollar per hundred-weight and fifty pounds be put upon the scale, it will take a fifty-pound or fifty-cent weight to counterbalance it when the pendant is at the selling-price of one dollar per hundred-weight. If, on the other hand, grain is worth two dollars per hundred-weight, the pendant will be moved in half-way on the beam to the $2.00 mark, and it will then require a weight twice as heavy to counterbalance the load, and this weight will be one hundred units, representing one hundred cents, or the value of fifty pounds at $2.00 per hundred. If it were selling at two dollars and fifty cents per hundred and the pendant moved to the $2.50 mark it would then require weights representing one dollar and twenty-five cents to balance the load, the value that is shown by the weights being the value of the load.

In Fig. 1 is shown a load of wheat of three hundred and sixty-six pounds, which, at one dollar per hundred, would require three hundred and sixty-six units of weight on the pendant at the $1.00 mark to balance it, as shown to the extreme right of the figure, and as these units represent cents the value is ascertained with the weight. Now, suppose these three hundred and sixty-six pounds of wheat are worth one dollar and forty cents per hundred, the pendant is moved in to the $1.40 mark, as shown in its intermediate position, and enough weights added to balance the load at this point, and it will be found that one hundred and forty-six units have been added to the three hundred and sixty-six before on the pendant, making a total of five hundred and twelve units, or $5.12, the value of three hundred and sixty-six pounds at one dollar and forty cents per hundred; or, if the selling-price is one dollar and ninety-two cents per hundred, the pendant and marker must go to $1.92 on the scale, as represented in their left-hand position, and there must be added three hundred and thirty-seven units of weight, which, added to the three hundred and sixty-six already on the pendant, makes a total of seven hundred and three, or $7.03, the value of three hundred and sixty-six pounds at one dollar and ninety-two cents per hundred.

To ascertain the weight alone, irrespective of the selling-price at any figure above one dollar per hundred, the load must be balanced at the unit-point of the beam by the weights on the pendant. If the value only of the load is to be ascertained irrespective of its weight, the pendant may be first placed at the figure on the beam which represents the selling-price, and then by putting on the weights until the load is balanced its value, but not its weight, will be ascertained. The $1.00 mark on the scale-beam need not necessarily be at its end, but may be, say, fifty or any number of points in from the end, so that the value of goods selling at a less value than fifty cents per hundred may be ascertained by moving the pendant out on the beam beyond the unit-point and putting onto it a less number of weights than would be required to balance the load at the unit-point of the beam.

It will be understood that although cereals are represented in the scale at so much per bushel, in making the transfers the number of bushels is always ascertained by the weight of the grain and not by its bulk. The weight of a bushel of wheat is sixty pounds; of corn or rye, fifty-six pounds; of oats, thirty-two pounds; of barley, forty-eight pounds, and wheat at sixty cents per bushel would equal $1.00 per one hundred-weight; seventy-five cents per bushel would equal $1.25 per one hundred-weight.

Each scale will advisably be supplied with a tabular statement or scale of prices showing what the bushel quotations will equal in one-hundred pound values.

In the second construction, (indicated in Fig. 3,) B' represents the scale-beam pivoted at b' and connected with the pan or platform by means of a link C'. For convenience this beam is longitudinally slotted to receive the sliding marker D', which carries, by means of the pendant link E' and a disk e' at the bottom of said link, the weights or counterpoises F', and marks from the outer toward the inner end of the beam, except when intended to ascertain weights alone, as hereinafter explained.

F² represents poises at the inner end of the beam, for a purpose usual in scales. At the upper edge of each arm of the beam, or it may be at the upper edge of one arm only, or at the upper edge of the beam itself, in case there is no longitudinal slot, (or at either edge of arm or beam,) is a series of graduations, marking pounds up to any desired number— 500 or 1,000—the lowest numbers being at the inner end of the beam and the highest at the outer end, as in the ordinary scale.

Beneath the pound-index the beam is longitudinally divided to afford a list of the ordinary cereals of trade and the pounds to each bushel thereof—such as "Oats, 32 lbs. per bushel," "Corn, rye, and flaxseed, 56 lbs.," as plainly indicated on the drawings, and opposite the name and weight of each particular cereal is a scale running therefrom to the outer end of the beam and graduated from said outer end up to the number of pounds per bushel to such cereal—as, for instance, oats being thirty-two pounds per bushel, this scale runs from 0 to 32, and wheat being sixty pounds per bushel the corresponding scale runs from 0 to 60, and so on for the other cereals.

A convenience in having the beam longitudinally slotted other than that before noted is that it makes a break in the list of cereals, so that the operator will associate any given cereal with one or the other group in the upper or lower arm of the beam, and that it will therefore be more rapidly found.

The weights or counterpoises upon the pendant at the outer end of the scale-beam will, as in the first construction, represent both pounds and values—that is, a weight which will mark a certain number of dollars on the inverted scales accompanying the list of cereals will mark a certain number of pounds upon the scale-beam.

Now, suppose wheat is selling at sixty cents a bushel. The sliding marker is placed at 0 at the outer end of the beam, and the number of one-dollar weights required to balance the load will be the value of the weight. If it is selling at sixty-six cents per bushel, the marker must be moved six of the sixty points graduated in the wheat-line toward the inner end or fulcrum of the beam, and the number of one-dollar weights and fractions thereof that are then required to balance the load will be the value of the wheat at sixty-six cents per bushel, and so on until the marker reaches the inner end of the wheat-line—that is, the point 60, which is intended to be equivalent to two dollars per hundred pounds, (since one dollar and twenty cents per bushel will be two dollars per hundred, or twice as much as sixty cents per bushel, which is one dollar per hundred.)

Should there be any doubt as to the correct weight of the wheat, it will be indicated upon the pound-scale, either by the sliding marker and the unit-weights of dollars and pounds thereon, or else by this sliding marker combined with the inner poises, which can be run out to get parts of hundreds, instead of putting fractions of units on the pendant from the sliding marker.

I do not intend to limit myself to the specific features of my invention as herein described, since the scale-beam may be graduated to represent pounds instead of dollars, and since, as already suggested, the invention is applicable to different forms of scales, so long as the rule is observed that one unit of a scale should equal one unit of pendant-weight or its multiple.

I claim as my invention—

1. The combination, with a scale-beam, of weights representing both units of money value and units of weight.

2. A scale-beam graduated as described, combined with weights or counterpoises representing units of weight and units of value.

3. A scale-beam graduated up from the outer end to represent units of value, combined with a sliding marker and weights or counterpoises representing both units of value and units of weight.

4. A scale-beam having longitudinal divisions marked with a list of cereals or other articles of trade and their respective weights for given quantities, and having opposite the name of each of said articles an inwardly-running scale graduated from zero up to the given weight for said article, combined with a sliding marker and with poises representing units of value and units of weight, as described.

5. A scale-beam graduated from the inner to the outer end with units of pounds and having longitudinal divisions, each containing the name of a cereal or other article of trade, with its corresponding weight for a given quantity, and an inversely-running scale to each division marked from zero up to said weight, combined with a sliding marker and poises representing at once units of weight and units of value.

6. The longitudinally-slotted scale-beam herein described, having scales running from the inner to the outer end and graduated to represent units of weight, and scales running from the outer to the inner end and graduated as described, with the names, and giving weights of cereals or other articles opposite said inverted scales, combined with a sliding marker and counterpoises indicating units of value and weight and with a sliding poise or poises on the beam itself.

GEORGE L. PHELPS.

Witnesses:
A. S. WELLS,
L. VASSALL.